3,192,222
N'-[1-PHENYL-PROPYL-(2)]-N"-[PHENYL-PYRI-
DYL-(2)]-ETHYLENE DIAMINE
Albert Gross, Frankfurt am Main, Germany, assignor to
Deutsche Gold- und Silber-Scheideanstalt vormals
Roessler, Frankfurt am Main, Germany
No Drawing. Filed Dec. 10, 1962, Ser. No. 243,665
Claims priority, application Germany, Dec. 14, 1961,
D 37,673
1 Claim. (Cl. 260—296)

The present invention relates to new diaryl amino derivatives of aryl amino alkanes of the formula

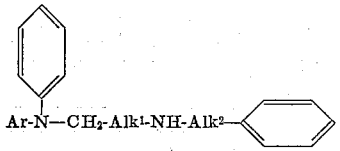

wherein Ar is phenyl or pyridyl, $Alk^1$ is an alkylene group with 1 or 2 carbon atoms and $Alk^2$ is a straight or branched chained alkylene group of 2–3 carbon atoms of which at least 2 are in the chain between the nitrogen atom and the phenyl group connected thereby. The new compounds are useful pharmaceuticals and especially have good coronary dilating action. They also can be converted to the equivalent pharmaceutically acceptable acid addition salts with acids having pharmaceutically unobjectionable anions such as hydrochloric acid, phosphoric acid, sulfuric acid, hydrobromic acid, hydroiodic acid, acetic acid, citric acid, p-toluene sulfonic acid, maleic acid and the like.

The compounds according to the invention can, for example, be prepared by reacting an amine of the formula

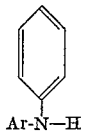

with a compound of the formula

with liberation of hydrogen halide. Expediently, such reaction is carried out at elevated temperatures in the presence of a solvent and a basic acid acceptor, such as sodium amide.

Another suitable procedure for producing the compounds according to the invention consists in reacting a compound of the formula

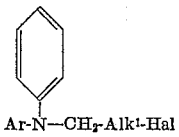

with a compound of the formula

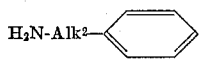

with liberation of hydrogen halide, preferably at elevated temperatures in the presence of a solvent and an acid acceptor.

Still another suitable process for producing the compounds according to the invention is the hydrogenation of a compound of the following formula

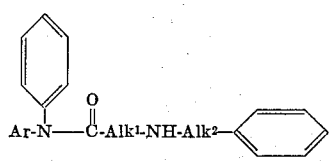

or

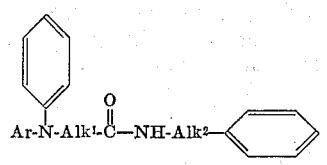

to convert the carbonyl group to the methylene group. Lithium aluminum hydride or other complex hydrides of boron or aluminum, such as the alkali metal aluminum or borohydrides, for instance, lithium borohydride and aluminum hydride, can be employed as the hydrogenating agent.

The carbonyl compounds employed as intermediates can be prepared by reacting a compound of the formula

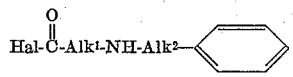

or

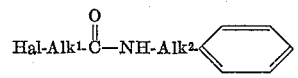

with a compound of the formula

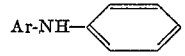

Such carbonyl compounds also can be prepared by reacting a compound of the formula

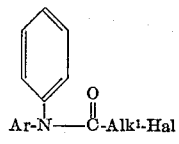

or

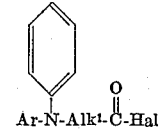

with a compound of the formula

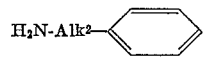

The compounds according to the invention furthermore can be prepared by reductive condensation of a compound of the formula

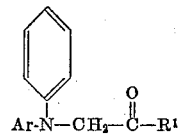

or

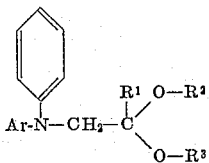

with a compound of the formula

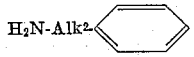

In such formulae, $R^1$ signifies hydrogen or methyl and $R^2$ and $R^3$ signify lower alkyl.

The following examples illustrate the invention with reference to several embodiments thereof.

Example 1

12.3 g. of 1-phenyl-2-amino propane and 22.2 g. of chloracetic acid diphenyl amide were held at 140° C. for 15 minutes. The resulting mixture was alkalized in the presence of benzene and the benzene layer separated off. Upon evaporation of the benzene N-[1-phenyl-propyl-(2)]-amino acetic acid diphenyl amide was recovered and dissolved in 40 cc. of acetone and converted to the hydrochloride salt (M.P. 212–214° C.) with isopropanolic HCl.

31 g. of N-[1-phenyl-propyl-(2)]-amino acetic acid diphenyl amide were run into a solution of 4.1 g. of lithium aluminum hydride in 250 cc. of diethyl ether at 25° C. over a period of 20 minutes. The mixture was then held for 50 minutes at 30° C. and finally boiled for 1 hour under reflux. After the mixture cooled down water was added carefully to decompose the excess hydride and the ether layer dried. The ether was then driven off and the N'-[1-phenyl-propyl-(2)]-N''-diphenyl ethylene diamine distilled over between 180–200° C. at a pressure of 0.2 torr. The yield was 10.5 g. The hydrochloride of the base melts at 180–182° C.

Example 2

19 g. of [phenyl-pyridyl-(2)-amino]-acetic acid-[1'-phenyl-propyl-(2)-]-amide, prepared analogously to the diphenyl amide of Example 1 dissolved in 80 cc. of tetrahydrofurane, were added dropwise to a solution of 2.5 g. of lithium aluminum hydride in 200 g. of diethyl ether and 20 g. of tetrahydrofurane at 25° C. The reaction mixture was then stirred for one hour at room temperature and finally boiled under reflux for 45 minutes. After the reaction mixture had cooled down water and ethyl acetate were added to decompose the excess lithium aluminum hydride. The organic phase was separated off, dried and the solvents driven off to leave 19 g. of still impure N'-[1-phenyl-propyl-(2)] - N'' - [phenyl-pyridyl-(2)]-ethylene diamine.

After several recrystallizations the maleic acid salt of a melting point of 136–138° C. was prepared.

I claim:

N'-[1-phenyl-propyl-(2)]-N'' - [phenyl - pyridyl - (2)]-ethylene diamine.

References Cited by the Examiner
UNITED STATES PATENTS

| | | | |
|---|---|---|---|
| 2,739,981 | 3/56 | Szabo et al. | 260—570.8 |
| 2,837,536 | 6/58 | Fox | 260—570.8 |
| 3,013,020 | 12/61 | Fancher | 260—570.8 |

OTHER REFERENCES

Gaylord: "Reduction With Complex Metal Hydrides," pp. 544–6 (Interscience) (1956).

WALTER A. MODANCE, *Primary Examiner.*

NICHOLAS S. RIZZO, IRVING MARCUS, *Examiners.*